April 30, 1963 E. B. LE VAN 3,087,537
WINDOWS
Filed Sept. 27, 1960 2 Sheets-Sheet 1
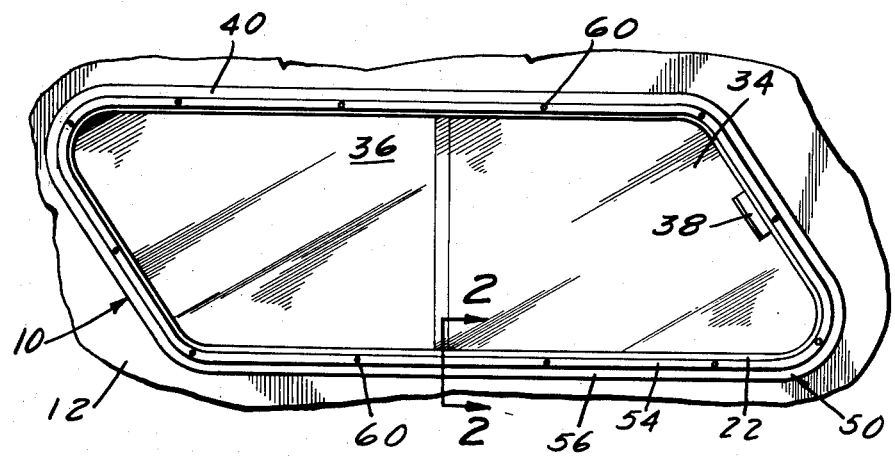
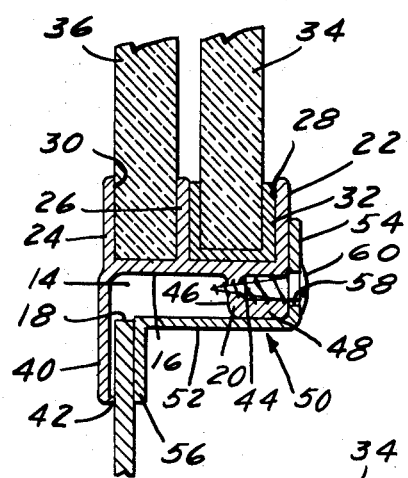
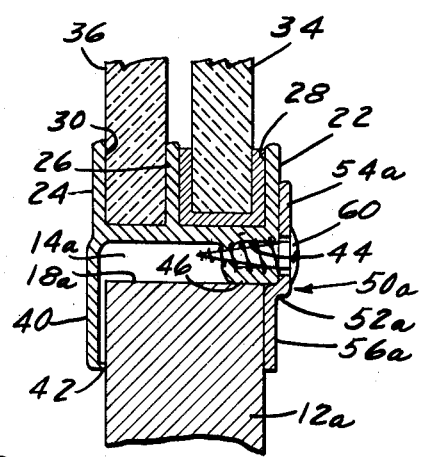
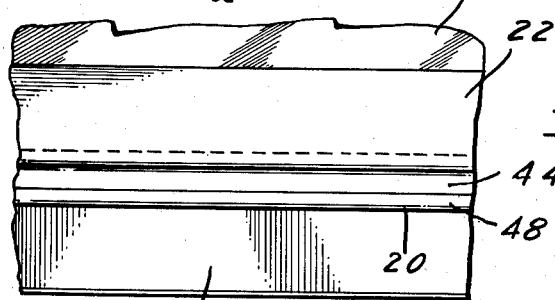
Eugene B. Le Van,
INVENTOR.
BY
Attorney April 30, 1963  E. B. LE VAN  3,087,537
WINDOWS
Filed Sept. 27, 1960  2 Sheets-Sheet 2

Eugene B. Le Van
INVENTOR.

BY
Attorney

United States Patent Office 3,087,537
Patented Apr. 30, 1963

3,087,537
WINDOWS
Eugene B. Le Van, Whittier, Calif.
(3945 Whittur Blvd., Los Angeles 23, Calif.)
Filed Sept. 27, 1960, Ser. No. 58,675
5 Claims. (Cl. 160—91)

This invention relates generally to windows and relates more particularly to metal framed windows for installation in buses, trailers, boats and the like.

While the invention has particular utility in connection with metal framed windows for trailers, boats and the like, and is shown and described in such connection, it is to be understood that its utility is not confined thereto.

There are certain problems and difficulties involved in the provision of suitable windows for buses, trailers, boats, and the like and it is an object of the present invention to solve these problems and overcome said difficulties.

One of the problems involved is the provision of a window having a frame that may be easily and quickly installed in a wall opening provided therefor with a minimum of labor time and expense, and the present invention solves this problem.

One type of window for buses, trailers, boats and the like has a metal frame with a flange at one side that overlaps the edge portion of the wall opening and has a ring secured to the other side of the frame by means of screws, said ring also having a flange that overlaps an edge portion of the wall opening at the side opposite the frame flange. The ring has screw receiving holes in it and it has heretofore been necessary to drill screw receiving holes in the frame with the latter holes in accurate register with the screw holes in the ring preparatory to attaching the ring to the frame. This takes a considerable amount of time and skill and hence is a relatively expensive operation.

It is therefore another object of the invention to provide a window for buses, trailers, boats and the like having a frame which does not require the drilling of said screw receiving holes therein which must accurately register with the screw receiving holes in the ring.

It is still another object of the invention to provide a window having a frame of said character which may be easily and quickly installed in an opening provided therefor in a wall.

It is a further object of the invention to provide a device of this character that may be easily and quickly installed by even unskilled laborers.

It is a still further object of the invention to provide a device of this character that may be installed in walls of different thicknesses. Such accommodation of the device is effected by the use of respective rings which are adapted to particular wall thicknesses.

Another obejct of the invention is to provide a device of this character having screw receiving means in the frame in which the self tapping screws for attaching the ring and securing the window in position in the wall opening provided therefor are received with the threads of said screws cutting into parts of said screw receiving means to thereby threadably secure the parts together.

Still another object of the invention is to provide a device of this character wherein said screw receiving means also receives a screen edge portion into which said edge portion is securely anchored, the screen covering a portion of the window opening defined by the window frame.

A further object of the invention is to provide a window frame of this character wherein one of the window panes is slidable between a position whereat the pane closes that part of the window covered by the screen, and a position whereat said part of the window is open but the opening is protected against the entrance of insects and the like by said screen.

A still further object of the invention is to provide a window of this character wherein there is novel locking means for the slidable pane for releasably locking same in the closed position.

Another object of the invention is to provide a window of this character that is relatively inexpensive to manufacture.

The characteristics and advantages of the invention are further sufficiently referred to in connection with the following detailed description of the accompanying drawings, which represent certain selected arrangements. After considering these examples, skilled persons will understand that many variations may be made without departing from the principles disclosed, and the employment of any structures, arrangements or modes of operation that are properly within the scope of the accompanying claims is contemplated.

Referring to the drawings, which are for illustrative purposes only:

FIG. 1 is a side view of a window embodying a portion of the present invention;

FIG. 2 is an enlarged sectional view taken on line 2—2 of FIG. 1;

FIG. 3 is an enlarged sectional view of the window frame with an alternative ring attached thereto;

FIG. 4 is an enlarged fragmentary portion of the inner side of the frame;

Figure 5:
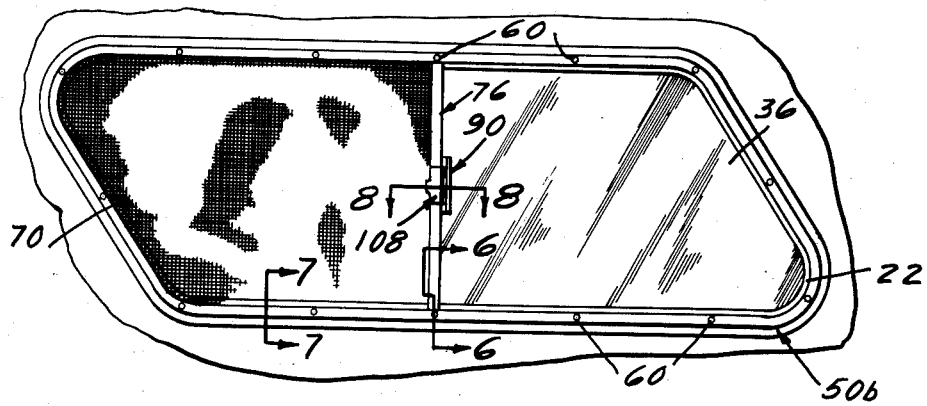
FIG. 5 is a side view of the window with a screen secured to the frame and with the slidable pane having the releasable locking means secured thereon.
Figure 6:
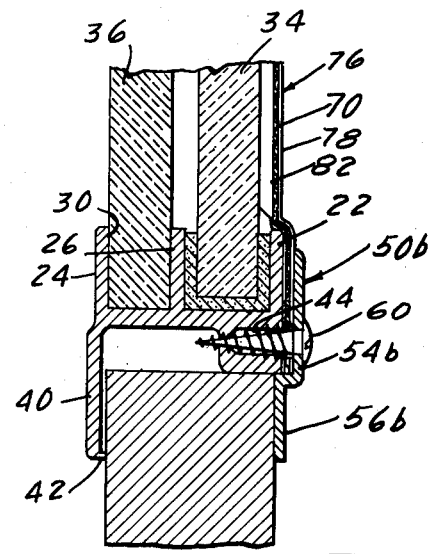
FIG. 6 is an enlarged sectional view taken on line 6—6 of FIG. 5.

Referring more particularly to the drawings, there is shown a window frame, indicated generally at 10, which may be of any suitable shape to fit a particular shaped opening in a wall 12, the particular opening shown being indicated at 14, FIG. 2, and is rhomboidal in shape, the shape of the frame also being rhomboidal.

Frame 10 comprises a base part 16 which is in a plane normal to the plane of the wall 12 and is coextensive with the free edge 18 of the wall defining the opening 14 but spaced inwardly from said edge to provide installation clearance for an enlarged bead 20 which will be described more particularly hereinafter.

From the base part 16 there are inner and outer flanges 22 and 24 which project inwardly a limited distance and extend continuously along the inner and outer edges of the base part 16 and are normal thereto. Intermediate the flanges 22 and 24 there is a flange 26 of substantially the same inward projection as flanges 22 and 24. These flanges define inner and outer continuous channels inwardly facing channels 28 and 30 about the inside of the frame.

Inner channel 28 is wider than channel 30 and is provided with a liner channel 32 of felt or any other suitable material. The channel defined by the liner 32 slidably receives a window pane 34 of suitable configuration. A fixed window pane 36 is disposed in the channel 30 and is secured therein by any suitable well known means, such as, for example, an adhesive of any well known character. The window panes are both of less length than the window frame and their inner or adjacent edges overlap in the usual well known manner. A handle 38 is attached by any well known means to the outer end of the pane 34 whereby said pane may be easily moved longitudinally in the channel of the liner 28.

From the outer edge of the frame part 16 there is a retainer flange 40 which is normal to the part 16 and parallel to the outer surface of the marginal wall portion adjacent the edge 18. Flange 40 overlaps a substantial marginal wall portion, as best shown in FIGS. 1 and 2, and there is an inturned rib 42 along the free edge of the flange 40, said rib engaging the adjacent surface of the wall to provide a snug fit against undue entrance of air, rain, dust or other foreign matter.

Bead 20 extends on the side of the base 16 opposite the channels and at the interior edge thereof. There is a groove on channel 44 in the bead 20, said groove facing oppositely of the flange 40 that is, toward the interior of the vehicle or the like in which the window is installed, and is defined by a bottom 46 normal to the base 16, a wall 48 extending away from said flange 40 and the adjacent portion of the base part 16. Groove 44 is continuous about the frame at the inner side thereof.

There is a ring, indicated generally at 50, which is removably attachable to the frame. The ring may be of various cross sectional shapes according to the thickness of the wall in which the frame is installed and is of any suitable material such as aluminum. For a relatively thin wall, such as shown in FIG. 2, the ring is Z-shaped in cross section, including the central part 52 which is parallel to the base part 16 of the frame, and oppositely arranged flanges 54 and 56 along the inner and outer edges of the central part 52.

Flange 54 overlies the bead 20 and at least a portion of the flange 22 when said ring is installed, it being understood that the ring extends continuously at the inner side of the frame 10. A plurality of holes 58 are formed in the flange 54 in spaced relation about the ring 50 and when said ring is positioned on the frame said holes 58 are at the open side of the channel 44 and communicate with said channel.

The ring 50 is secured to the frame by means of self tapping screws 60 which are inserted in holes 58 and screwed into the groove 44, the threads of screws 60 cutting into the side walls of the groove since the width of said groove is less than the diameter of the screws, or at least a substantial portion of said screws. Also, the pointed ends of the screws 60 penetrate the bottom wall 46 of the groove and pass through same, as shown in FIG. 2. The screws 60 are relatively easily screwed into the walls of the groove since the characteristics of the material of the bead is such as to permit the self tapping action of said screws. With this groove arrangement the screws 60 do not have to exactly register with the walls of the groove and it is only necessary to form, by punching or the like, the holes 58 in the flange 54. It is not necessary to drill holes in the frame exactly or accurately registering with the holes in the flange 54. It has been found that the screws 60 may be easily and quickly screwed into the walls of the groove 44 by automatic screw drivers.

When the ring 50 is thus attached to the frame, the flange 56 thereof tightly abuts against the marginal edge portion of the wall 12 at the side opposite the flange 40 so that this part of the wall about the opening 14 is tightly clamped between said flanges 40 and 56 to tightly secure the frame in the opening 14.

Referring now to FIG. 3, there is shown a window having a frame like the one hereinabove described but provided with a different ring for use with a relatively thick wall, indicated at 12a.

The ring, indicated generally at 50a, has flanges 54a and 56a corresponding to flanges 54 and 56 of the arrangement hereinabove described. However, the part connecting the adjacent edges of flanges 54a and 56a and indicated at 52a is of reduced width so that when the flange 54a is screwed tightly against flange 22 of the window frame the flange 56a tightly abuts the adjacent side of the wall 12a to thereby clamp the frame tightly in position in the opening provided therefor in the wall 12a, said opening being indicated at 14a. It is to be noted that in the arrangement shown in FIG. 4 the bead 20 engages the wall edge 18a defining the window opening 14a of the wall 12a. The width of the part of the ring connecting adjacent edges of the flanges 54a and 56a is varied in accordance with the thickness of the wall in which the window is to be mounted.

In the arrangement shown in FIGS. 5, 6, 7 and 8, the frame is the same as above described and the ring 50b which is similar to the one shown in FIG. 3. In the arrangement shown in FIGS. 5 to 8 the fixed window pane 36 is at the right hand end of the frame, while the sliding pane 34 is at the opposite end of the frame when said pane 34 is in the closed position.

Figure 7:
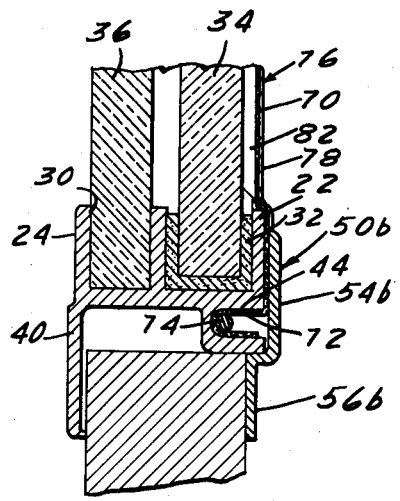
FIG. 7 is an enlarged sectional view taken on line 7—7 of FIG. 5.

There is a screen 70 secured to the frame at the end of the frame having the pane 34. The top, bottom and outer or left hand end, as shown in FIG. 5, of the screen have marginal edge portions 72 which are pressed into the groove 44 of the frame. A cord 74 of suitable material is disposed in the groove and over that part of the marginal edge portions at the bottom of the groove 44, as shown in FIG. 7, said cord wedging the marginal edge portions 72 of the screen in said groove 44.

Figure 8:
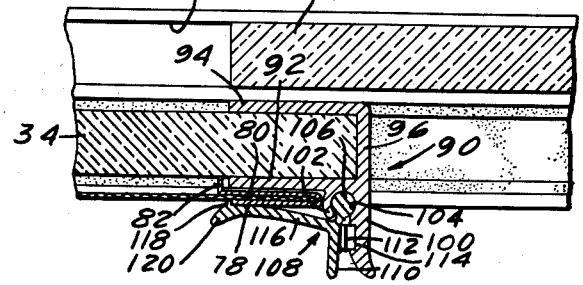
FIG. 8 is an enlarged sectional view taken on line 8—8 of FIG. 5.

At the inner end of the screen there is a reinforcing member, indicated generally at 76, which is arranged vertically. Member 76 is in the general cross sectional shape of a narrow U, as shown in FIG. 8, and has arms 78 and 80 at opposite sides of the screen clampingly engaging an edge portion of the inner end of the screen. Arm 80 has a flange 82 along its free edge which extends toward the sliding pane 34 to close the space between the screen and pane 34.

Each end of the member 76 is secured to the frame by respective screws 60 which are disposed in openings provided therefor in the ends of member 76. These screws are also received in openings provided therefor in the flange 54b of the ring 50b. These screws 60 are screwed into the walls and bottom of the groove or channel 44 of the frame and together with other screws 60 spaced along the ring 50b secure the screen 70 and the screen reinforcing member 76 to the frame, the ring 50b covering the portions of the screen lying against the outer surface of the flange 22 of the frame and the end portions of the member 76.

The window is also provided with latching means, indicated generally at 90, comprising a U-shaped member having arms 92 and 94 with a connecting wall 96. An edge portion of the inner end of pane 34 is received between the arms 92 and 94 of the U-shaped latch member and the wall 96 abuts the free edge of said pane 34. The length of the latch member is substantially less than the width or height of the pane 34 and said member is secured to the pane by any suitable well known means. A suitable adhesive may, of course, be used.

A flange 100 extends away from or outwardly of the U-shaped member and in the same plane as the wall 96 although it may be otherwise arranged and connected to said member.

At the side of flange 100 adjacent the screen there is a short flange 102 which is spaced from flange 100 but curved toward same to form a socket 104 for pivotal reception of a cylindrical pivot member 106 of a movable latch member indicated generally at 108. From the pivot member 106 there extends a lever 110 which is normally spaced from the flange 100 and is yieldingly urged away from same by any suitable means such as a leaf spring 112 which has end portions operably disposed in a recess 114 so that a central part of spring 112 engages the adjacent side of lever 110. Thus the spring operably reacts between the flange 100 and the lever 110.

Projecting from the side of lever 110 opposite the flange 100 is a hook member 116 which is provided at its free edge with a hook 118 latchingly engaging the free edge of the arm 78 of the reinforcing member 76 of the screen when the pane 34 is in the closed position. From the hook 118 the member 116 has an outwardly curved lip 120 so that when the pane 34 is moved from an open position to the closed position the closed edge of the reinforcing member 76 will be engaged by said lip and the latching member 108 is pivotally actuated in a counter clockwise direction, as viewed in FIG. 8 so the hook member 116 will pass over the adjacent arm 78 of the reinforcing member and the hook 118 will engage the free edge of said reinforcing member to thereby latch the pane 34 in the closed position. Spring 112 will, of course, urge the movable latch member 108 clockwise to insure engagement of the hook 118 with the free edge of arm 78 of member 76.

When it is desired to slide the pane 34 to the open position, that is toward the right as viewed in FIGS. 5 and 8, the flange 100 and lever 110 are engaged with the fingers and said lever actuated in the counter clockwise direction against the force of spring 112. The hook 118 is thereby disengaged from the free edge of arm 78 of reinforcing member 76. Pane 34 may then be moved to an open position.

The invention and many of its attendant advantages will be understood from the foregoing description and it will be apparent that various changes may be made in the form, construction, and arrangement of the parts thereof without departing from the spirit and scope thereof or sacrificing its material advantages, the forms hereinbefore described being disclosed merely as examples.

I claim:

1. A window, comprising: an elongated aluminum frame having flanges defining a pair of interior channels; a flange continuous with the frame and extending outwardly of the channeled portion of the frame in a plane parallel to the planes of said channels for engagement with a marginal portion of a wall about an opening provided therein for said window; a bead continuous with the frame and at the side thereof opposite said flange, said bead having a groove therein facing away from said flange; window panes in respective channels, said panes being of less length than the frame and having adjacent edges overlapping when in closed position, at least one of said panes being slidable in its channel; a retaining ring at the beaded side of the frame, said ring having a flange overlying said bead and an adjacent portion of the frame and having screw openings therein spaced apart about said ring and in communication with the groove of said bead, there being an oppositely extending flange engageable with a marginal wall portion about the window opening and on the side of the wall opposite the first mentioned flange; self tapping screws received in said screw openings and screwed into the walls of the groove in said bead; a screen for that portion of the window having the slidable pane, said screen having marginal portions disposed within the groove of said bead; a cord at the outer side of the screen portions in said groove for wedging said screen portions therein; a screen reinforcing member secured to the free inner end of the screen in parallel relation to the adjacent end of the slidable pane, said reinforcing member having a flange turned inwardly toward the adjacent pane and a free edge at the outer side of the screen, the end portions of the reinforcing member having screw receiving openings registered with adjacent ring openings and receiving screws therein, said end portions being disposed under the first mentioned ring flange which also clamps screen marginal portions against the adjacent side of the frame; and a latch secured to the inner end of the slidable pane and having a hook part releasably engageable with said free edge of said reinforcing member.

2. A window, comprising: an elongated frame having flanges defining channels for panes; a wall clamping flange on the frame and at one side thereof for engagement with a portion of a wall about an opening provided therein for said window; a bead on said frame and at the side thereof opposite said flange, said bead having a groove therein facing away from said flange; window panes in respective channels, said panes being of less length than the frame and having adjacent inner edge portions overlapping when in closed position; a retaining ring at the beaded side of the frame, said ring having a part overlying said bead and having screw openings therein spaced apart about said ring and in communication with the groove of said bead, there being another part of said ring engageable with a wall portion about the window opening and on the side of the wall opposite the first mentioned flange; self tapping screws received in said screw openings and screwed into the walls of the groove in said bead; a screen for that portion of the window having the slidable pane, said screen having marginal portions disposed within the groove of said bead; a cord at the outer side of the screen portions in said grooves wedging said screen portions therein; a screen reinforcing member secured to the free inner end of the screen in parallel relation to the adjacent end of the slidable pane, the end portions of the reinforcing member having screw receiving openings registered with adjacent ring openings and receiving screws therein, said ring also clamping peripheral screen portions to said frame; and a latch secured to the inner end of the slidable pane and having a latching member releasably engageable with said reinforcing member.

3. In a window; an elongated frame having channels for window panes; a flange on said frame at one side thereof engageable with a portion of a wall about an opening provided therein for the window; a bead on said frame at the side thereof opposite the flange, said bead having a groove therein facing away from said flange; a screen covering at least a portion of the window and having marginal edge portions disposed within the groove of the bead; means in said groove wedging said marginal edge portions of the screen in said groove; a retaining ring at the beaded side of the frame, said ring having a plurality of screw receiving openings therein spaced apart about said ring and communicating with said groove when said ring is in retaining position, said ring being disposed over a portion of the screen adjacent said bead and over said bead; and self tapping screws in said screw openings and screwed into the walls of the groove in said bead.

4. The invention defined by claim 3 wherein the screen covers only a portion of the opening defined by the frame and there is a reinforcing member on the inner edge of said screen; a window pane slidable in one of the channels for window panes; and a latch secured to an edge of said window pane, said latch having a member releasably engageable with said reinforcing member for releasably latching said pane in the closed position.

5. In a window: a frame having channels for window panes; window panes in said channels, said panes being of less length than the frame with the inner ends of said panes adjacent each other, one of said panes being slidable in its channel; a screen over that portion of the window having the slidable pane when the latter is in the closed position, the inner edge of said screen being adjacent the inner end of said pane, a reinforcing member along the inner edge of said screen; and a latch attached to the inner edge of said slidable pane, said latch having a latching member releasingly engaging said reinforcing member when the slidable pane is in its closed position.

References Cited in the file of this patent

UNITED STATES PATENTS

| | | |
|---|---|---|
| 1,653,351 | Evans | Dec. 20, 1927 |
| 2,283,009 | Levan | May 12, 1942 |
| 2,512,298 | Bonnell | June 20, 1950 |
| 2,672,959 | Young | Mar. 23, 1954 |
| 2,859,930 | Brunsting et al. | Nov. 11, 1958 |